(No Model.)

E. HARTUNG.
COOKING UTENSIL.

No. 557,672. Patented Apr. 7, 1896.

Witnesses:
Geo. W. Rea.
Thos. A. Green

Inventor:
Emil Hartung,
By James L. Norris
Atty.

UNITED STATES PATENT OFFICE.

EMIL HARTUNG, OF MÜHLHAUSEN, GERMANY.

COOKING UTENSIL.

SPECIFICATION forming part of Letters Patent No. 557,672, dated April 7, 1896.

Application filed April 6, 1895. Serial No. 544,770. (No model.)

*To all whom it may concern:*

Be it known that I, EMIL HARTUNG, a subject of the King of Prussia, Emperor of Germany, residing at Mühlhausen, in the Kingdom of Prussia, in the German Empire, have invented new and useful Improvements in Cooking Utensils, of which the following is a specification.

My invention relates to a cooking utensil designed for cooking with air—that is to say, without water—the arrangement being such that the substances to be cooked—such as meat, fish, vegetables, potatoes, &c.—are placed in the utensil without any water, whereupon the utensil is inverted and the contents cooked.

Figure 1:
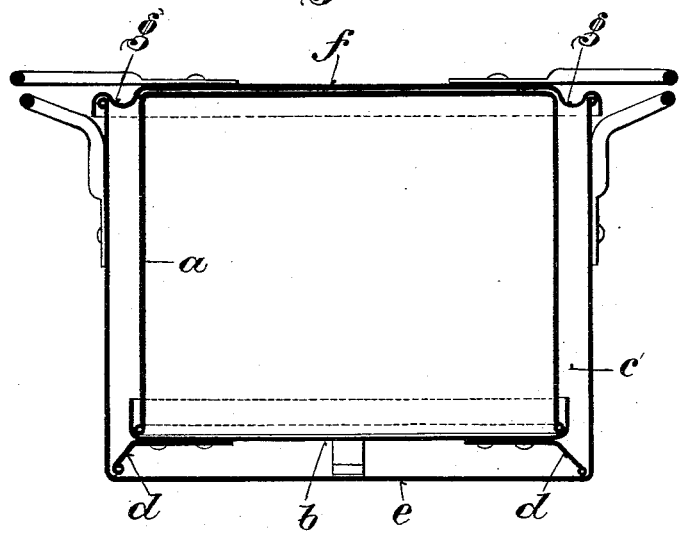
Figure 2:
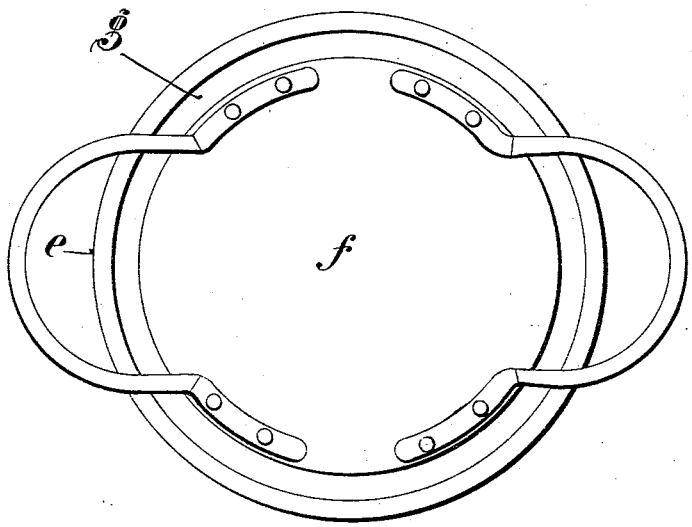

Figure 1 of the drawings is a vertical section of a cooking utensil according to my invention, and Fig. 2 is a plan thereof.

Upon the vessel $a$ is placed a cover $b$, which is provided with a flanged edge $c$ that serves to receive melted fat. The cover $b$ is provided with a number of feet $d$, which, when the cover $b$ has been placed upon the vessel and after that vessel has been inverted, keeps the cover $b$ out of contact with the source of heat and thereby prevents the food from burning.

In a closed space (such as a cooking or baking oven or flue) the utensil $a$ is employed alone; but in cooking on a direct fire or on a hot plate there is employed another vessel $e$, which receives the cooking utensil and serves as a heat collector and distributer, said vessel $e$ being closed in a suitable manner by means of a cover $f$.

The border-groove $g$ is provided in the cover in order to hold the cooking utensil $a$ at its upper edge.

The food which is contained in the cooking utensil and which is to be cooked is sealed or closed in automatically without steam-pressure by means of liquid which trickles out of the food itself, a very small quantity being sufficient, or is added thereto in the form of basting or dripping, because the upper edge of the inverted utensil rests upon the flat cover with an independent or separate bearing for itself and every drop of liquid acts under hermetic seal. The dripping contained in the utensil prevents even vegetables from adhering to the cover. If, however, in consequence of overheating or cooking for too long a time adhesion should take place, the adhering food can be very easily and quickly removed from the flat cover.

The main portion of the cooked food always falls back into the utensil when the latter is inverted for the purpose of being opened.

Food cooked in this cooking utensil is very much more nutritious and more easily digested than food that has been cooked with water, because the nutritious salts of the food are not soaked out, but remain in the food.

Having now particularly described the nature of my invention, what I claim, and wish to be protected by Letters Patent, is—

The herein-described cooking utensil, consisting of an outer casing $e$, a flanged tray or cover $b$, provided with feet $d$ and resting upon the bottom of the casing, an inverted food-receptacle $a$ located within the outer casing and seated upon said tray or cover, and the cover $f$, for the outer casing provided with a turned-down rim and annular rib $g$, said rim surrounding the outer casing and the annular rib located intermediate said outer casing and food-receptacle and adapted to support the upper portion of the latter, substantially as described.

In testimony whereof I have hereunto set my hand in presence of two subscribing witnesses.

EMIL HARTUNG.

Witnesses:
 WILHELM BINDEWALD,
 FANNIE MOORE.